July 21, 1959     L. V. BUCKLEW     2,896,102
ELECTRICAL CONDUCTOR AND PROCESS FOR MAKING SAME
Filed March 4, 1957     3 Sheets-Sheet 3

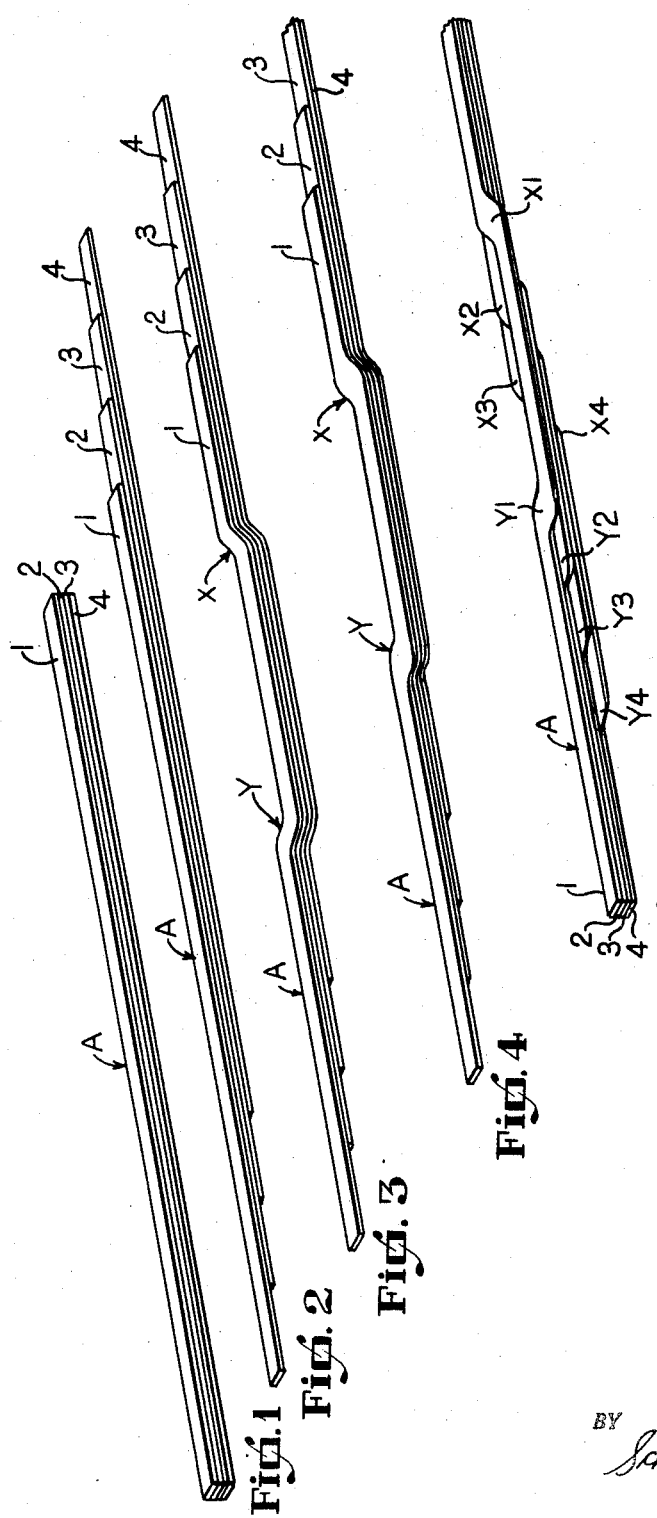

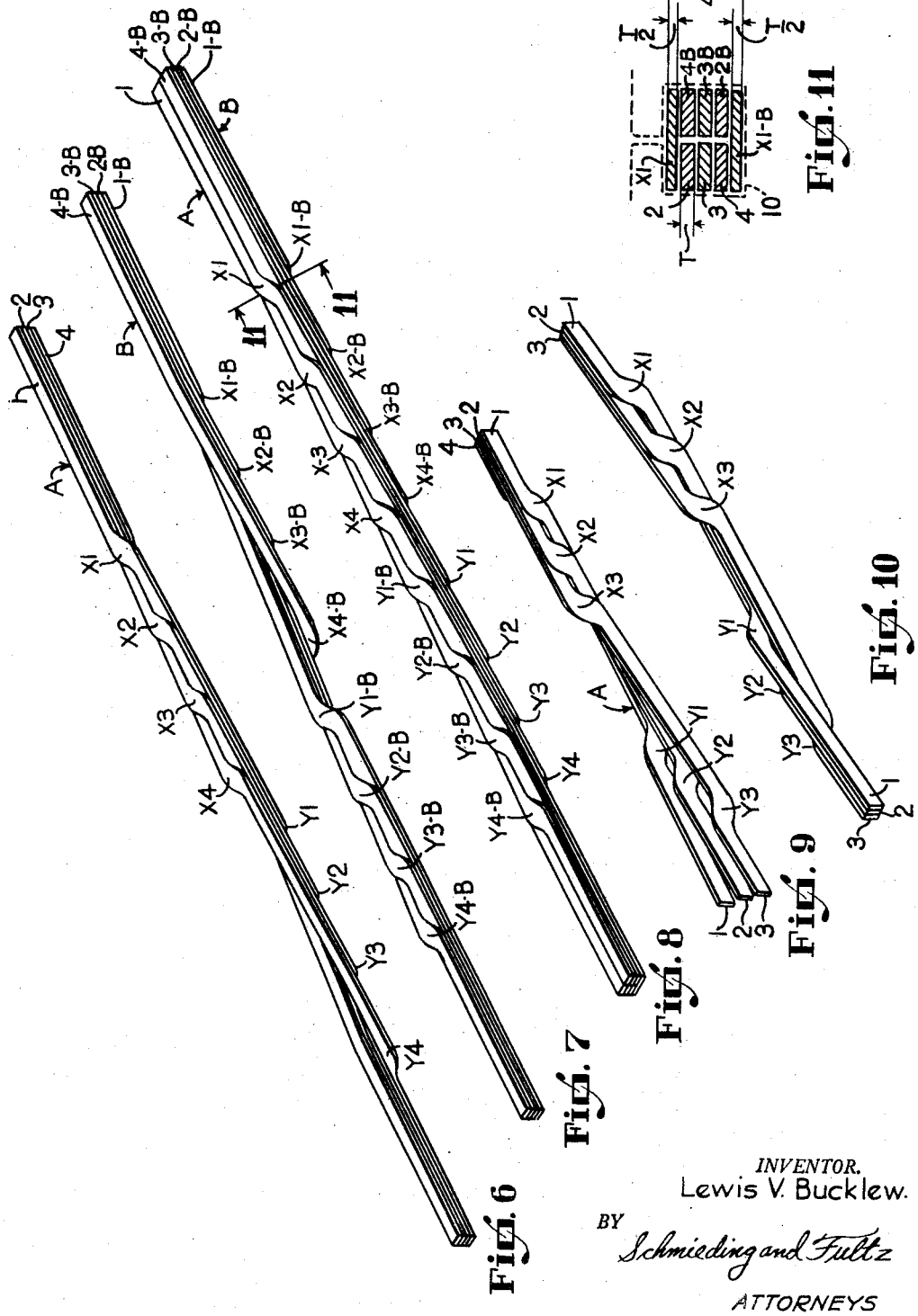

*INVENTOR.*
Lewis V. Bucklew.
BY *Schmieding and Fultz*
ATTORNEYS

2,896,102

ELECTRICAL CONDUCTOR AND PROCESS FOR MAKING SAME

Lewis V. Bucklew, Columbus, Ohio, assignor, by mesne assignments, to McGraw-Edison Company, a corporation of Delaware Application March 4, 1957, Serial No. 643,730

12 Claims. (Cl. 310—213)

This invention relates to electrical conductors for dynamo electric machinery and the like and more particularly to a novel composite conductor and method for forming same which conductor is of a type particularly adapted to be mounted in a slot of an electrical machine.

In dynamo electrical machines of heavy capacity with conductors of large copper cross-section it is well known that eddy currents are produced which cause considerable losses and excessive heating. It has been the practice in the art to replace such large copper conductors with a plurality of separate parallel component conductors which are generally insulated from one another. The plurality of conductors are then mounted in the slot of the electrical machine and utilized in the manner well known to the art.

In assembling such composite electrical conductors in the slot of an electrical machine it is advantageous to join the individual conductors together and to arrange same in a manner to most efficiently utilize the capacity of the slot in which they are mounted. A composite construction for this purpose is disclosed in the patent to Ludwig Roebel, U. S. Letters Patent No. 1,144,252.

In general, the present invention relates to an improved construction for the above mentioned type of composite electrical conductor, and a novel method of making same, which improved construction more efficiently utilizes the capacity of a slot of an electrical machine as compared to prior known constructions.

In general, the present composite conductor consists of a first plurality of stacked metallic strips joined to a second plurality of stacked metallic strips in interlocked relationship. Each of the metallic strips includes two angled off-sets that form cross-overs for the interlocked construction. According to the present invention, the cross-over portions of the metallic strips are formed with reduced thickness as compared to the thickness of the balance of the strip so that when the strips are assembled in stacked relationship and interlocked, a composite conductor of reduced height, for a given cross-sectional area of copper, is achieved. An advantage of this construction resides in the fact that it reduces losses due to the eddy current effect from the leakage fluxes at the cross-overs. In addition, such construction eliminates the presence of "pressure points" at the cross-overs since such cross-overs are flattened and shaped to conform to the shape of the adjacent conductor in the stack.

Other objects and advantages of the present invention will be apparent from the following description, reference being had to the accompanying drawings wherein a preferred form of embodiment of the invention is clearly shown.

In the drawing:

Figure 1 is a perspective view of a first stack of metallic strips used in connection with forming the conductor of the present invention;

Figure 2 is a perspective view of the stack of Figure 1 and showing the metallic strips thereof in staggered relationship;

Figure 3 is a perspective view of the stack of the preceding figures and showing the metallic strips thereof after such strips have been provided with two lateral off-set portions;

Figure 4 is a perspective view of the stack of the preceding figures and showing the elements thereof after the off-set portions have been reduced in thickness;

Figure 5 is a perspective view of the stacks of the preceding figures and shows the metallic strips thereof with their ends in aligned flush relationship and the offset portions thereof in staggered relationship;

Figure 6 is a perspective view showing the stack of the preceding figures after a weaving operation has been performed thereon in the manner illustrated in Figures 9 and 10;

Figure 7 is a perspective view of a second stack of metallic elements formed in the manner of the first stack of metallic elements illustrated in Figures 1 through 6. The stack of Figure 7 is the same as the stack of Figure 6 except that the latter has been rotated 180 degrees about its longitudinal axis;

Figure 8 is a perspective view illustrating the first stack of metallic elements of Figure 6 and the second stack of metallic elements of Figure 7 after such two stacks have been joined in interlocking relationship;

Figure 9 is a perspective view illustrating a step in the weaving of one of the stacks of the preceding figures;

Figure 10 is a perspective view showing another step in the weaving of one of the stacks of the preceding figures;

Figure 11 is a cross-sectional view of the assembled composite conductor of the preceding figures, the section being taken along the line 11—11 of Figure 8;

Figure 12:
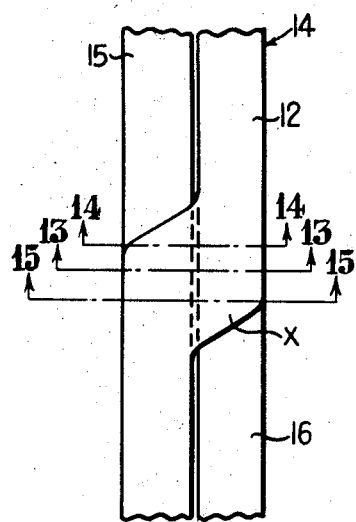
Figure 14:
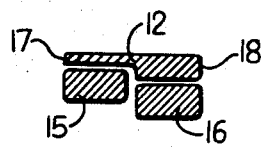
Figure 13:
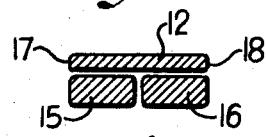
Figure 15:
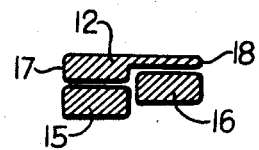

Figure 12 is a partial view of an assembled composite conductor showing a typical angled off-set thereof; and Figures 13 through 15 are partial cross-sectional views taken along the lines 13—13, 14—14, and 15—15 of the composite conductor of Figure 12 and showing the transition in cross-sectional thickness of a strip of such conductor at an angled off-set.

Referring in detail to the drawing, Figure 1 illustrates a stack of metallic strips with such stack being indicated generally at A and consisting of the individual metallic strips 1, 2, 3, and 4.

The strips are then moved along their longitudinal axes one relative to the other, to the staggered configuration shown in Figure 2 wherein the ends extend one beyond the other in equal amounts.

As seen in Figure 3, the stack 3 of metallic elements, with such elements disposed in staggered relationship, is provided with a first angled off-set indicated generally at X and a second angled off-set indicated generally at Y.

The angled junctions X and Y of Figure 3 are next reduced in thickness in the manner illustrated at X and Y in Figure 4.

As is seen in Figure 5, the metallic elements 1, 2, 3, and 4 are next moved along their longitudinal axes, one relative to the other, to the configuration in which their ends are flush as seen in Figure 5. In such flush configuration the individual segments 1, 2, 3, and 4 have off-sets of reduced thickness X1, X2, X3, and X4, in staggered relationship in the manner illustrated. In addition, these metallic elements also have angled off-sets of reduced thickness Y1, Y2, Y3, and Y4, in staggered relationship in the manner illustrated.

The stack of metallic elements disposed in the configuration of Figure 5 is next subjected to a weaving sequence to form such stack to the configuration of Figure 6. Reference is next made to Figures 9 and 10 for the purpose of explaining, in detail, the manner in which such weaving sequence is accomplished. The stack of Figure 5 is placed along the edge of a supporting surface such as a table with the right end disposed to the right of the worker and with the off-sets X1, X2, X3, and X4 and Y1, Y2, Y3, and Y4 down towards the surface of the table. The right ends of the strips are retained together and metallic element 2 is brought over metallic element 1 with a clock-wise motion. Metallic element 3 is next brought over elements 1 and 2. This is continued until all strands have been transposed. The right end of stack A is next bound. Next starting at the left end the weaving is continued in the similar manner by bringing strand 2 over strand 3 and by bringing strand 1 over strands 2 and 3 and by continuing such operation until all strands have been transposed back to the configuration illustrated in Figure 10.

The next step in the construction of the composite conductor consists of forming a second stack of electrical conductors with such stack being indicated generally at B and consisting of a plurality of conductor elements 1B, 2B, 3B, and 4B, as seen in Figure 7. Such second stack B of electrical conductors is identical to the first stack A of electrical conductors and is formed in an identical manner. In positioning the two stacks for assembly, however, the second stack B is rotated 180 degrees about its longitudinal axis to the disposition illustrated in Figure 7. The stacks A and B, with stack B rotated 180 degrees about its longitudinal axis, are next fitted together to complete the assembly of the composite conductor illustrated in Figure 8.

Reference is next made to Figure 11 which is a cross-sectional view of the assembled composite conductor of Figure 8, the section being taken along the line 11—11 which passes through angled off-set X1 of metallic conductor 1 and a corresponding angled off-set X1-B of metallic conductor 1B. In Figure 11 a slot of a typical electrical machine is schematically illustrated by the dotted delineation 10 and the composite conductor is shown as being disposed in such slot. According to the preferred form of the present invention, the thickness of the angled off-sets, such as X1 at the section, of metallic element 1 are reduced to one-half the normal thickness of the conductor. Such reduction in thickness is indicated by T/2 in Figure 11. In a similar manner, the thickness of angled off-set X1-B is reduced to one-half the normal thickness of metallic element 1B as is indicated by T/2 in Figure 11. The thickness of each of the other metallic elements 2, 3, and 4 of stack A and 2B, 3B, and 4B of stack B are, at the cross-section of Figure 11, of the normal thickness T of such metallic elements. When the two stacks A and B of the metallic elements are assembled in interlocked relationship the total thickness of the composite conductor will equal three times the thickness T plus two times the thickness T/2 for a total thickness of 4T as is indicated by the dimension arrow 4T in Figure 11. From consideration of Figure 11, it will be understood that if the cross-over portions X1 and X1B were not reduced in thickness to the thickness T/2, but were left at the normal thickness T, the total height of the composite conductor would be 5T instead of 4T with the result that the slot 10 would necessarily have to be higher by the thickness T of one conductor in order to confine the same cross-sectional area of copper conducting material.

Reference is next made to Figures 12 through 15 which illustrate a typical angled off-set portion X formed in a strip 12 of a composite conductor constructed according to the present invention and indicated generally at 14. It will be noted that in progressing from the view at section 14—14 to the view at section 15—15 the angled off-set X includes first a left side 17 that is decreased in thickness and a right side 18 that is decreased in thickness a lesser amount than left side 17. At central section 13—13 both the left side 17 and right side 18 of angled off-set X have been decreased in thickness by the same amount i.e. to a thickness of T/2 as described above. At the section 15—15, however, right side 18 of angled off-set X has been decreased in thickness a greater amount than left side 17. It will be understood that by providing such variations in thickness of sides 17 and 18 of angled off-set X the bottom surface of strip 12 is shaped to conform with the top surfaces of adjacent strips 15 and 16. Hence the presence of the previously mentioned "pressure points" is effectively prevented throughout the length of the conductor.

The construction shown is given by way of example only and may be modified. For example, the number of component conductors may vary and the number of groups may be other than two. As another variation, the number of twists may be greater than one.

Although the cross-sectional shape of the individual conductor elements is preferably rectangular, it will be understood that other cross-sectional shapes may be employed without departing from the spirit of the present invention.

The assembled composite conductor illustrated in the figures of the present application may be insulated one from the other in various conventional ways. When the two stacks A and B are joined one to the other the confronting portions can be painted inside with thin Bakelite and thin thicknesses of sheet insulating material may be inserted between the sections. After the stacks A and B are joined the composite assembly can be painted with a thin Bakelite film and all voids on top and bottom of the assembly may be filled flush with an uncured filling compound. The composite structure can then be wrapped with a temporary covering such as waxed paper, and hot pressed to cure the filling compound. If desired, small sheets of insulating material, such as flexible mica tape may be inserted under each of the angled off-sets and the next adjacent metallic element.

While the form of embodiment of the present invention as herein disclosed constitutes a preferred form, it is to be understood that other forms might be adopted, all coming within the scope of the claims which follow.

I claim:

1. An improved electrical conductor for dynamo electric machinery and the like, said conductor comprising a plurality of metallic strips each with two angled off-sets at portions of reduced thickness, one off-set toward one edge of the strip and the other off-set away from said edge; the strips forming one-half of the conductor being assembled in such a manner that a group is formed wherein said portions of reduced thickness are disposed in co-planar relationship along a side of said conductor to form a longitudinally extending conductor portion of reduced thickness and wherein the strip which is at the bottom or side at one end passes by way of the top or other side at one off-set to the bottom or original side at the next off-set; the strips forming the other half of the conductor being similarly assembled; one-half being turned through 140 degrees and the two halves being assembled in interlocking relationship, said portions of reduced thickness including a left side that decreases in thickness in one longitudinal direction and a right side that decreases in thickness in the other longitudinal direction, said right and left sides forming two oppositely inclined inner surfaces overlying two oppositely inclined outer surfaces on two of said metallic strips.

2. An improved electrical conductor for dynamo electric machinery and the like, said conductor comprising a number of metallic strips each provided with two angled off-sets at portions of reduced thickness, one off-set toward one edge of the strip and the other off-set away from said edge; the strips being disposed at angles to the off-sets and with the off-sets evenly displaced in adjacent strips in each half of the conductor, said portions of reduced thickness being disposed in co-planar relationship along a side of said conductor to form a longitudinally extending conductor portion of reduced thickness, the two halves of the conductor being relatively rotated through 180 degrees and joined in assembled relationship, said portions of reduced thickness including an inner side conforming substantially in shape with two oppositely inclined outer sides of two of said metallic strips.

3. An improved electrical conductor for dynamo electric machinery and the like, said conductor comprising a metal strip having a portion extending in a straight line, an angled off-set at a portion of reduced thickness formed in said metal strip, a bend at said angled off-set inclining a portion of said strip away from the straight line portion, a second angled off-set formed in said strip, a second bend at said second off-set, and a further straight line portion on the same plane as the first mentioned straight line portion, said portions of reduced thickness including a first left side portion reduced in thickness a greater amount than an adjacent first right side portion and a second left side portion reduced in thickness a lesser amount than a second right side portion.

4. An improved electrical conductor adapted to be disposed in a rectangular groove of a dynamo electric machine or the like, said conductor comprising a metallic strip having a portion horizontally disposed along the upper surface of said groove, an angled off-set formed in said strip at a portion of reduced thickness thereof, a bend inclining a portion of said strip downwardly to the bottom surface of the groove, a second angled off-set formed in a portion of reduced thickness of said strip, a second bend inclining a portion of said strip upwardly to the upper surface of said groove, and a second portion extending along the upper surface of the groove in co-planar relationship with said first mentioned portion, said portions of reduced thickness including a left side that decreases in thickness in one longitudinal direction and a right side that decreases in thickness in the other longitudinal direction, said two sides forming oppositely inclined surfaces.

5. An improved electrical conductor for dynamo electric machinery and the like, said conductor comprising a metallic strip with two angled off-sets at portions of reduced thickness, one toward one edge of said strip and the other away from said edge, said conductor being adapted to be inserted in a rectangular groove in such position that opposite end portions of the strip are at the bottom or one side of the groove and an intermediate portion of the strip is at the top or other side of the groove, said portions of reduced thickness including a left side that decreases in thickness in one longitudinal direction and a right side that decreases in thickness in the other longitudinal direction, said two sides forming oppositely inclined surfaces.

6. An improved electrical conductor for disposition in a groove of an electric machine comprising a first stack of metallic strips; a second stack of metallic strips, each of said strips including a first portion the longitudinal axis of which is parallel to the longitudinal axis of said conductor and a second portion the longitudinal axis of which is inclined relative to said longitudinal axis of said first portion; and an off-set crossover portion between said first and second portions of each of said strips, said crossover portions being of reduced thickness as compared to the thickness of said first and second portions, said portions of reduced thickness including a left side that decreases in thickness in one longitudinal direction and a right side that decreases in thickness in the other longitudinal direction, said right and left sides forming two oppositely inclined inner surfaces overlying two oppositely inclined outer surfaces on two of said metallic strips.

7. An improved electrical conductor for disposition in a groove of an electric machine comprising a first stack of metallic strips; a second stack of metallic strips, each of said strips including a first portion the longitudinal axis of which is parallel to the longitudinal axis of said conductor and a second portion the longitudinal axis of which is inclined relative to said longitudinal axis of said first portion; and an off-set crossover portion between said first and second portions of each of said strips, the thickness of the center of said crossover portions being substantially one-half the thickness of said first and second portions, said portions of reduced thickness including an inner side conforming substantially in shape with two oppositely inclined outer sides of two of said metallic strips.

8. An improved electrical conductor for disposition in a groove of an electric machine comprising a first stack of metallic strips; a second stack of metallic strips, each of said strips including end portions the longitudinal axes of which are parallel to the longitudinal axis of the conductor and an intermediate portion the longitudinal axis of which is inclined relative to said longitudinal axes of said end portions; an off-set crossover portion between one of said end portions and said intermediate portion of each of said strips, said crossover portions being of reduced thickness as compared to the thickness of said first and second portions; and a second off-set crossover portion between one of said end portions and said intermediate portion of each of said strips, said second crossover portions being of reduced thickness as compared to the thickness of said second and third portions, said portions of reduced thickness being disposed in co-planar relationship along a side of said conductor to form a longitudinally extending conductor portion of reduced thickness, said portions of reduced thickness including a first left side portion reduced in thickness a greater amount than an adjacent first right side portion and a second left side portion reduced in thickness a lesser amount than a second right side portion.

9. An improved electrical conductor for disposition in a groove of an electric machine comprising a first stack of metallic strips; a second stack of metallic strips, each of said strips including end portions the longitudinal axes of which are parallel to the longitudinal axis of the conductor and an intermediate portion the longitudinal axis of which is inclined relative to said longitudinal axes of said end portions; an off-set crossover portion between one of said end portions and said intermediate portion of each of said strips, the thickness of the center of said crossover portions being substantially one-half the thickness of said first and second portions; and a second off-set crossover portion between the other of said end portions and said intermediate portion of each of said strips, the thickness of the center of said second crossover portion being substantially one-half the thickness of said second and third portions, said portions of reduced thickness being disposed in co-planar relationship along a side of said conductor to form a longitudinally extending conductor portion of reduced thickness, said portions of reduced thickness including a left side that decreases in thickness in one longitudinal direction and a right side that decreases in thickness in the other longitudinal direction, said right and left sides forming two oppositely inclined inner surfaces overlying two oppositely inclined outer surfaces on two of said metallic strips.

10. The steps in the method of forming an improved electrical conductor which method comprises stacking a plurality of metallic strips one above the other; staggering the ends of said metallic strips; forming two angled off-sets in said stack of staggered metallic strips; reducing the thickness of said strips at said off-sets; aligning the staggered ends of said stack in flush relationship to effect staggering of said off-sets; weaving the ends of said stack so that the top strip of said stack extends to the bottom of said stack at an off-set and includes a portion disposed along said bottom, and so that said portions of reduced thickness are disposed in co-planar relationship along a side of said conductor to form a longitudinally extending conductor portion of reduced thickness; forming a second stack of metallic strips identical to said first mentioned stack in the manner described above; and assembling said first and second stacks in interlocked relationship.

11. The steps in the method of forming an improved electrical conductor which method comprises stacking a plurality of metallic strips one above the other; staggering the ends of said metallic strips; forming two angled off-sets in said stack of staggered metallic strips; reducing the thickness of each of said strips at said off-sets to substantially one-half the original thickness; aligning the staggered ends of said stack in flush relationship to effect staggering of said off-sets; weaving the ends of said stack so that the top strip of said stack extends to the bottom of said stack at an off-set and includes a portion disposed along said bottom, and so that said portions of reduced thickness are disposed in co-planar relationship along a side of said conductor to form a longitudinally extending conductor portion of reduced thickness; forming a second stack of metallic strips identical to said first mentioned stack in the manner described above; and assembling said first and second stacks in interlocked relationship to form a composite stack of substantially twice the width and substantially the same height as one of said first and second stacks.

12. The steps in the method of forming an improved electrical conductor which method comprises stacking a plurality of metallic strips one above the other; staggering the ends of said metallic strips; forming two angled off-sets in said stack of staggered metallic strips; reducing the thickness of said strips at said off-sets and shaping same to conform with adjacent strips when the strips are assembled; aligning the staggered ends of said stack in flush relationship to effect staggering of said off-sets; weaving the ends of said stack so that the top strip of said stack extends to the bottom of said stack at an off-set and includes a portion disposed along said bottom, and so that said portions of reduced thickness are disposed in co-planar relationship along a side of said conductor to form a longitudinally extending conductor portion of reduced thickness; forming a second stack of metallic strips identical to said first mentioned stack in the manner described above; and assembling said first and second stacks in interlocked relationship.

References Cited in the file of this patent

UNITED STATES PATENTS

| | | |
|---|---|---|
| 678,030 | Priest | July 9, 1901 |
| 1,144,252 | Roebel | June 22, 1915 |
| 1,653,784 | Roebel | Dec. 27, 1927 |

FOREIGN PATENTS

| | | |
|---|---|---|
| 129,788 | Great Britain | July 15, 1919 |